United States Patent [19]

Delfyett, Jr.

[11] Patent Number: 5,434,873
[45] Date of Patent: Jul. 18, 1995

[54] SELF STARTING FEMTOSECOND TI SAPPHIRE LASER WITH INTRACAVITY MULTIQUANTUM WELL SATURABLE ABSORBER

[75] Inventor: Peter J. Delfyett, Jr., Oviedo, Fla.

[73] Assignee: University of Central Florida, Orlando, Fla.

[21] Appl. No.: 241,620

[22] Filed: May 12, 1994

[51] Int. Cl.⁶ .............................. H01S 3/098
[52] U.S. Cl. ........................ 372/18; 372/45; 372/11; 372/41
[58] Field of Search ............. 372/18, 45, 41, 40, 372/42, 6, 11

[56] References Cited

U.S. PATENT DOCUMENTS 4,860,296  8/1989  Chemla et al. .................. 372/44

OTHER PUBLICATIONS

Mellish et al, "Self-Starting Femtosecond Ti:Sapphire Laser with Intracavity Multiquantum Well Asborber", Electronics Lett's 30 Mar. 1993, vol. 29 No. 10 pp. 894–895.

Primary Examiner—Leon Scott, Jr.
Attorney, Agent, or Firm—Brian S. Steinberger

[57] ABSTRACT

A mode-locked solid state laser is disclosed for generating ultrashort optical pulses from solid state material. The laser can comprise a solid state gain medium, at least one mirror connected to the medium and a semiconductor multiple quantum well saturable (MQW) absorber in contact with the mirror, for mode-locking the solid state gain medium. The solid state medium can be composed of but is not limited to Titanium Sapphire, Cr:YAG, Cr:Fosterite, Nd:YAG, Nd:glass, color center lasers, semiconductor diode lasers, optically active fiber lasers, and the like. The absorber can include a structure consisting of 70 Angstrom wells of GaAs and 100 Angstrom barriers of AlGaAs. The generated optical pulses can be used in a wide variety of applications such as diagnostic testing, communications, computers, medicine, automotive applications and the like.

7 Claims, 2 Drawing Sheets

SELF STARTING FEMTOSECOND TI SAPPHIRE LASER WITH INTRACAVITY MULTIQUANTUM WELL SATURABLE ABSORBER

This invention relates to lasers, and in particular to an intracavity multiquantum well saturable (MQW) absorber for generating ultrashort optical pulses from solid state material such as Titanium Sapphire.

BACKGROUND AND PRIOR ART

Solid state lasers have been used to generate ultrashort optical pulses. However, there are problems inherent with these lasers. The techniques utilized to generate these pulses have generally relied on sophisticated electro-optic modulation techniques or passive techniques which use organic dyes to initiate the pulse generation process. These active and passive techniques add complexity and potential hazards to the operation because of the additional components added to the system and the chemical dangers of organic dyes.

Existing starting mechanisms for passive mode-locked lasers have cost approximately $5,000. These starting devices have required spaces of approximately one foot per side for the space needed. External power supplies such as RF power and mechanically actuated pumps have generally been needed for these mechanisms.

Thus, this invention reduces the problems inherent with current mechanisms.

SUMMARY OF THE INVENTION

The first objective of the present invention is to provide a method of generating ultrashort optical pulses from solid state material such as Ti:Sapphire.

The second object of this invention is to provide a method of sustaining ultrashort optical pulse generation from solid state material such as Ti:Sapphire.

The third object of this invention is to provide an efficient starting mechanism for the generation of ultrashort optical pulse trains in mode-locked lasers.

The fourth object of this invention is to provide a low cost starting mechanism for the generation of ultrashort optical pulses trains in mode-locked lasers.

The fifth object of this invention is to provide a starting mechanism that does not need an external power supply for the generation of ultrashort optical pulse trains in mode-locked lasers.

The invention is used as a new starting mechanism for the generation of ultrashort optical pulse trains in mode-locked lasers. The invention reduces the cost of previous methods of starting mechanisms for passive mode-locked lasers by 90% from approximately $5,000 to $500. The starting mechanism of the invention can be as small as 0.1 inch on a side as compared to 1 foot on a side for prior mechanisms. The invention requires no external power supplies to operate.

The solid state laser medium in conjunction with the semiconductor multiple quantum well device becomes an ultrashort optical pulse generator when placed within an optical cavity. The starting mechanism disclosed generates high power ultrashort optical pulse trains from tunable solid state gain media such as but not limited to Ti:Sapphire, Cr:Fosterite or Cr:YAG. The generated optical pulses can be used in a wide variety of applications such as diagnostic testing, communications, computers, medicine and automotive applications.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1:
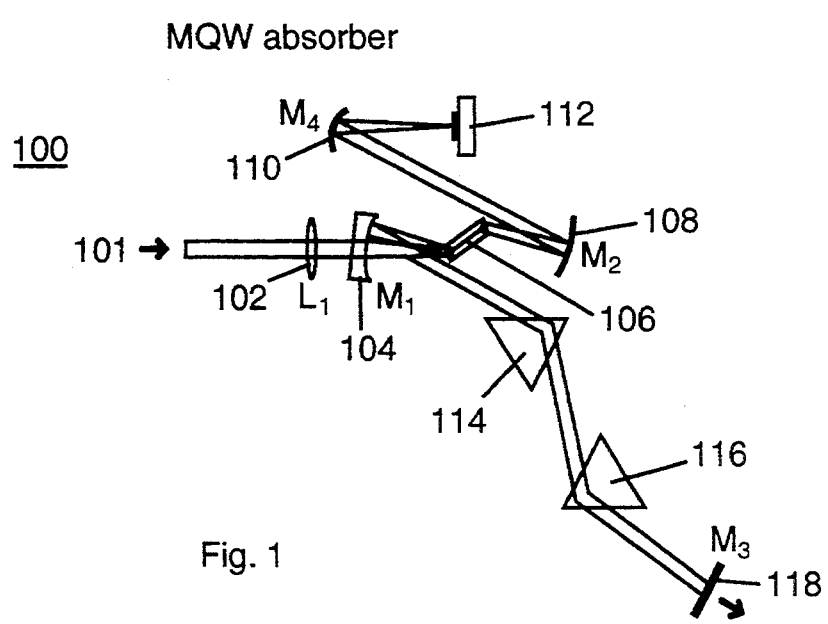
FIG. 1 shows a schematic diagram of a Titanium Sapphire Laser which is mode-locked with a semiconductor multiple quantum well saturable absorber.

FIG. 1 shows a schematic diagram of a Titanium Sapphire Laser 100 which is mode-locked with a semiconductor multiple quantum well saturable absorber. The components of FIG. 1 will now be described. The input to the laser system is an optical beam 101 which passes through and is focussed by lens 102. The input pump beam can be obtained from another laser, such as an Argon ion laser or the like. Component 102 refers to a positive lens used to focus the pump radiation into the laser medium 106. Elements 104, 108, 110, 112, and 118 refer to mirrors which comprise the optical cavity for the mode-locked solid state laser medium. 106 refers to the solid state gain medium, such as Titanium Sapphire. 112 is a semiconductor multiple quantum well (MQW) saturable absorber in contact with a high reflecting mirror. MQW absorber 112 is on the front surface of the high reflecting mirror.

MQW Absorber 112 can be comprised of 70 angstrom wells of GaAs with 100 Angstrom barriers of AlGaAs, where the relative amounts of Ga and Al atoms have been arranged to be present in the AlGaAs material with 30% aluminum and 70% gallium. Totally, this means that 50% of the atoms are Arsenic, 15% Aluminum and 35% Gallium.

The layer of GaAs is grown on top of a layer of AlGaAs. Then, a layer of AlGaAs is grown on top of the GaAs. This alternating layered process is continued to be grown so that 100 pairs of AlGaAs/GaAs layers are obtained.

Referring to FIG. 1, components 114 and 116 are prisms which are included in an optical cavity formed from mirrors 104, 108, 110, 112 and 118, in order to compensate for intracavity group velocity dispersion. Intracavity group velocity dispersion is an effect which tends to lengthen the optical pulse duration. The prism pair composed of 114 and 116 compensates for this effect, compressing the optical pulse, making it shorter in time.

The operation of the components of FIG. 1 will now be described. An optical beam 101 is directed and focussed by lens 102, passes through the curve mirror 104 and is injected into the solid state medium 106 of Titanium Sapphire. These components serve as the input or pump to the Ti:Sapphire laser 106. Amplified spontaneous emitted light is generated from the Ti:Sapphire crystal 106. The light is collected and collimated with lens 108. The light is then directed to focussing mirror 110, where the light is focussed by 110 onto the semiconductor multiple quantum well(MQW) saturable absorber and high reflecting mirror combination component 112. The semiconductor MQW saturable absorber 112 acts as a temporal gate, which only allows a short optical pulse to pass through, be reflected and directed back into the gain medium 106. This process called passive mode-locking by saturable absorbers is the starting mechanism for ultrashort optical pulse generation from a solid state laser media. Once the saturable absorber 112 allows a short optical pulse to pass, it is directed back towards the gain media, mirror 110 collects and collminates the light pulse from saturable absorber/mirror 112 and directs the light toward curved mirror 108.

Again referring to FIG. 1, mirror 108 then focuses the light pulse into the gain media 106. The light pulse emerges amplified and is collected and collimated by dichroic mirror 104, which directs the beam to prism pair 114, 116. Prism pair 114, 116 has the effect of compressing and shortening the optical pulse, an effect also called group velocity dispersion compensation. The light pulse exits the prism pair slightly shorter than when it entered and is directed towards the output coupler mirror 118. This mirror transmits a small amount of the optical pulse (approximately 1 percent), with 99 percent of the light pulse reflected back into the optical cavity toward prism pair 114, 116. The optical pulse passes through the prism pair 114, 116 and is further shortened. The light is then redirected and focussed into the solid state gain medium 106 by curved mirror 104. The optical pulse is further amplified, and is collected, collimated, redirected and focussed into the semiconductor saturable absorber 112 by mirrors 108 and 110. The process of optical pulse gating by the saturable absorber 112, amplification by laser material 106, and pulse compression by prism pair 114, 116 continues indefinitely within the optical cavity defined by mirrors 11.2, 108, 104 and 118, emitting an output of ultrashort optical pulses from mirror 108 until the optical beam 101 is interrupted.

Figure 2:
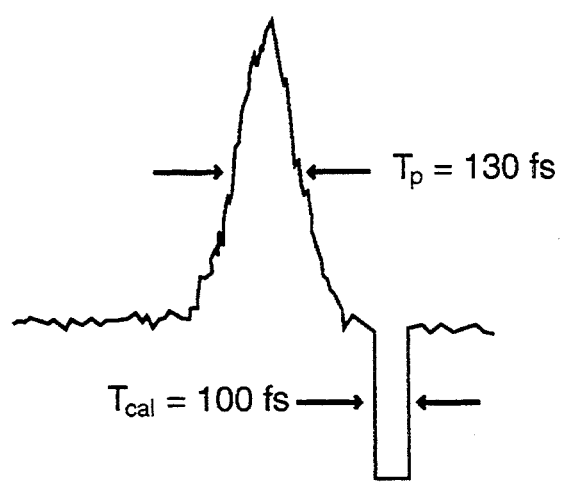
FIG. 2 illustrates the second harmonic intensity autocorrelation function plotted versus time delay, which illustrates the output pulse duration generated by the laser invention of FIG. 1.

FIG. 2 shows the second harmonic intensity autocorrelation function plotted versus time delay, which illustrates the output pulse duration generated by the laser invention of FIG. 1. The optical pulse shown in FIG. 2 is an autocorrelation of 130 femtoseconds in duration. This corresponds to an actual pulse duration of less than 90 femtoseconds. The peak power can be as high as 10 kilowatts.

The invention disclosed herein can have wide array of applications. In communications, the invention can be used as a transmitter of optical data in fiber optic networks. In computers, the invention can be used as a transmitter of optical data, as high speed processors of optical data and as high speed switches of optical data, and the like. In medical applications, the invention can be used for imaging through body tissue. In high speed diagnostic applications, the invention can be used to measure optical-matter phenomena in condensed matter materials, to measure very fast events, processes, mechanisms, interactions and the like. Further, the invention can have applicability for initiating or as seed pulses in solid state generative amplifier systems.

Although, the preferred embodiment utilizes Titanium Sapphire as the solid state media, other types of solid state materials can be used such as but not limited to Cr:YAG, Cr:Fosterite, Nd:YAG, Nd:glass, color center lasers, semiconductor diode lasers, and optically active fiber lasers.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A self starting mode-locked solid state laser for generating ultrashort pulses comprising:

a solid state gain medium composed Of Titanium Sapphire for emitting light;

a mirror connected to the medium for focussing the light therethrough; and semiconductor multiple quantum well saturable absorber for receiving the focussed light from the mirror, the absorber allowing a short optical pulse to be reflected back to the mirror and then back to the gain medium for mode-locking the solid state gain medium to generate ultrashort pulses.

2. The mode-locked solid state laser of claim 1, wherein the absorber includes: GaAs and AlGaAs.

3. The mode-locked solid state laser of claim 2, wherein the absorber further includes a structure of:

70 Angstrom wells of GaAs and 100 Angstrom barriers of AlGaAs.

4. A self staring mode-locked Titanium Sapphire laser for generating pulses comprising:

a solid state gain medium composed of Titanium Sapphire, for emitting light;

a mirror connected to the medium for focussing the light therethrough; and semiconductor multiple quantum well saturable absorber for receiving the focussed light from the mirror, the absorber allowing a short optical pulse to be reflected back to the mirror and then back to the gain medium, for mode-locking the solid state gain medium, the absorber includes a structure of:

70 Angstrom wells of GaAs and 100 Angstrom barriers of AlGaAs.

5. A self starting mode-locked laser for generating ultra short optical pulses comprising:

a solid state gain medium for emitting light, the gain medium selected from at least one of:

Cr:Fosterite, Cr:YAG, Nd:YAG, Nd:Glass and a Color Center Laser; and semiconductor multiple quantum well saturable absorber for receiving the focussed light from the mirror, the absorber allowing a short optical pulse to be reflected back to the mirror and then back to the gain medium, for mode-locking the solid state gain medium in order to generate ultrashort optical pulses.

6. The mode-locked solid state laser of claim 5, wherein the absorber includes: GaAs and AlGaAs.

7. The mode-locked solid state laser of claim 6, wherein the absorber further includes a structure of:

70 Angstrom wells of GaAs and 100 Angstrom barriers of AlGaAs.

* * * * *